United States Patent
Dornbach et al.

(10) Patent No.: US 7,576,636 B2
(45) Date of Patent: Aug. 18, 2009

(54) DRIVER AUTHORIZATION SYSTEM

(75) Inventors: Hannelore Dornbach, Aichwald (DE);
Hartmut Fitz, Urbach (DE); Michael Geber, Bad Urach (DE); Joern-Marten Ohle, Leonberg (DE); Peter Wieltsch, Boeblingen (DE)

(73) Assignee: Daimler AG, Stuttgart (DE)

( * ) Notice: Subject to any disclaimer, the term of this patent is extended or adjusted under 35 U.S.C. 154(b) by 238 days.

(21) Appl. No.: 10/528,148

(22) PCT Filed: Aug. 29, 2003

(86) PCT No.: PCT/EP03/09606
§ 371 (c)(1),
(2), (4) Date: Oct. 13, 2005

(87) PCT Pub. No.: WO2004/028871
PCT Pub. Date: Apr. 8, 2004

(65) Prior Publication Data
US 2006/0113841 A1 Jun. 1, 2006

(30) Foreign Application Priority Data
Sep. 18, 2002 (DE) ................ 102 43 318

(51) Int. Cl.
*B60R 25/10* (2006.01)
*E05B 45/06* (2006.01)
*G05B 19/00* (2006.01)
(52) U.S. Cl. .............. 340/426.1; 340/542; 340/5.1; 340/5.21; 340/5.6; 340/5.61; 340/5.62; 200/43.18
(58) Field of Classification Search ............... None
See application file for complete search history.

(56) References Cited

U.S. PATENT DOCUMENTS

| | | | | |
|---|---|---|---|---|
| 3,618,009 A | * | 11/1971 | Lee | 307/10.4 |
| 5,441,022 A | * | 8/1995 | Yoder et al. | 123/179.3 |
| 6,624,738 B2 | * | 9/2003 | Bracklo et al. | 340/3.51 |
| 6,794,768 B2 | * | 9/2004 | Uselli | 307/10.5 |
| 6,816,081 B1 | * | 11/2004 | Okada et al. | 370/462 |
| 6,832,151 B2 | * | 12/2004 | Kumazaki et al. | 701/112 |
| 6,986,272 B2 | * | 1/2006 | Sandvoss et al. | 70/409 |
| 6,992,565 B1 | * | 1/2006 | Giesler | 340/5.72 |
| 2004/0083374 A1 | * | 4/2004 | Sugawara | 713/189 |
| 2005/0023901 A1 | * | 2/2005 | Ghabra et al. | 307/10.5 |

FOREIGN PATENT DOCUMENTS

| | | |
|---|---|---|
| DE | 197 47 732 A1 | 10/1997 |
| DE | 198 03 046 A1 | 1/1998 |
| DE | 198 53 075 A1 | 11/1998 |

(Continued)

*Primary Examiner*—Julie Lieu
(74) *Attorney, Agent, or Firm*—Crowell & Moring LLP

(57) ABSTRACT

A driver authorization system for a vehicle includes an on-board identification device for communicating with a mobile release device to verify usage authorization, an ignition lock, ignition key, and a control unit for activating ignition lock functions (such as starting and switching off the engine) when the ignition key is brought into a corresponding position in the ignition lock. The ignition lock functions can be activated by means of the control unit using a pushbutton (6), that can be mounted in, actuated while mounted, and removed from the ignition lock.

8 Claims, 3 Drawing Sheets

FOREIGN PATENT DOCUMENTS

| | | | |
|---|---|---|---|
| DE | 198 60 350 | A1 | 12/1998 |
| DE | 199 43 999 | C2 | 9/1999 |
| DE | 19853075 | * | 5/2000 |
| DE | 100 34 348 | A1 | 7/2000 |
| EP | 0 905 337 | A1 | 3/1999 |

* cited by examiner

DRIVER AUTHORIZATION SYSTEM

BACKGROUND AND SUMMARY OF THE INVENTION

This application claims the priority of German patent document 102 43 318.6, filed Sep. 18, 2002 (PCT International Application No. PCT/EP2003/009606, filed Aug. 29, 2003), the disclosure of which is expressly incorporated by reference herein.

The present invention relates to a driver authorization system and a pushbutton for activating ignition lock functions.

Keyless driver authorization systems (so-called keyless go systems) are now common in vehicles. A keyless go system enables a user of a vehicle to open and start the vehicle without need for a vehicle ignition key. However, the driver must carry a mobile release device (for example, in the form of a credit card) as part of the keyless go system. The keyless go system controls the access authorization and the engine starting authorization for vehicle.

Keyless go systems include a transmitting/receiving device arranged on the motor vehicle for communicating with a mobile release device carried by a user. An authorization interrogation is initiated by an interrogation signal transmitted by the transmitting/receiving device, and is carried out before the vehicle can be opened, or the engine started. If the system detects that a usage-authorized release device is in the vicinity of the motor vehicle, the vehicle is unlocked and the engine start is released.

In conventional driver authorization systems with mechanical ignition key, the access authorization is verified via a mobile release device integrated in the vehicle ignition key, while the driver authorization is verified via the ignition key inserted into the ignition lock.

German patent document DE 197 47 732 A1 discloses a driver authorization system in which an electronically codable on-board identification device is provided which can be released by an external electronic release device (a so-called transponder), which, for example, replaces the mechanical vehicle key. The transponder has a storage element in which the necessary coding for releasing the identification device is stored. For the release device to communicate with the identification device, it must be positioned in the vicinity of the identification device so that a signal radiated by the identification device can be detected and processed by the release device. The signal of the identification device is checked in the release device and answered with a corresponding response signal, the signal variation of which must correspond to the electronic coding of the identification device. If transmitted signal and response signal of the driver authorization system match, at least one vehicle-specific device of the vehicle (for example an electronic controller for driving an internal combustion engine of the vehicle) is released.

It is also known to integrate the release device into an ignition key. The disadvantage of this arrangement is that, apart from the electronic communication between the identification device and the release device, both the ignition key and the ignition lock must have matching shape features. Due to the multiplicity of different locking systems in ignition keys, this complicates considerably the integration of an electronic driver authorization system.

To solve this problem, German patent document DE 197 47 732 A1 discloses an identification device which comprises a receptacle into which a release device can be inserted, and which exhibits an actuating device which can be triggered by the release device. It is no longer necessary to use an additional ignition key.

From German patent document DE 198 53 075 A1, it is also known that the release device can be brought into two positions, one being used to detect the release device and the other being used to trigger an ignition lock function.

In German patent document DE 198 60 350 A1, after a successful release dialog between an on-board identification device and a mobile identification transmitter, an engine start authorization control unit releases an actuating device. The latter is implemented with minimum installation space by providing a manually operable actuator with a securing module which correspondingly releases the actuator via the identification device. The released actuator enables the steering wheel to be mechanically unlocked and the engine to be started. The actuator can be constructed as a rotary switch which is associated with a pushbutton, which is used for starting the release dialog. To start the entire process including the required authorization interrogation, an electrical pushbutton is integrated, for example into the gearstick or gear selection lever at the top.

Known keyless engine start authorization control systems are mostly incorporated in keyless access authorization control systems, since the same hardware components can be used for performing the desired question/answer dialog.

Even if such a driver authorization unit as described above increases the operating convenience compared with conventional key systems, an additional actuating device must be provided in the passenger compartment near the driver, for initiating the start process. This actuating device impedes the vehicle design of the cockpit since additional space must be provided for it. Moreover, there are additional costs for switches and their cabling.

Due to the high susceptibility of the keyless go systems to radio interference sources such as, for example, garage door openers, radio headphones, etc., vehicles with keyless go systems also require an emergency engine start authorization system, consisting of ignition lock and key. Such radio interference sources have been released by the communication authority for frequency bands which are also used by keyless go systems. There is, therefore, the problem of always having to equip vehicles with keyless go systems with the standard electronic ignition lock and ignition key which are also provided for non-keyless go systems. In addition, vehicles with keyless go systems are equipped with an additional pushbutton connected to the electronic ignition lock, which increases production costs because the driver authorization system cannot be produced uniformly for vehicles with/without keyless go systems.

It is therefore an object of the present invention to provide a keyless go driver authorization system in which various ignition lock functions can be activated reliably and simply, without installing an operating element specially provided for this purpose in a vehicle.

This and other objects and advantages are achieved by the authorization system according to the invention, in which the ignition lock functions can be activated by means of the control unit, using a pushbutton that can be mounted and actuated on, and removed from, the ignition lock itself, without requiring the ignition lock to be operated in the form of rotating a key inserted into a rotary ignition lock.

The driver authorization system according to the invention has the advantage that it can be produced in the same manner for motor vehicles, both with and without keyless go systems. That is, the electronic ignition lock control unit (the electronic ignition lock with the associated control unit) can be produced identically for systems with or without keyless go. No additional cabling to a pushbutton is necessary for motor vehicles with a keyless go system. The electronic ignition lock does not have to be adapted to the keyless go system.

A further advantage of the invention is that the driver does not need to remember a new position for the starting button for starting the motor vehicle in a keyless go mode. Instead, the motor vehicle can be started from the same position independently of whether the motor vehicle is operated with ignition key or in keyless go mode.

It is also advantageous that the keyless go mode can be replaced by the standard system simply by removing the pushbutton. This is of particular importance in vehicles which are equipped with keyless go system. Although the pushbutton generally remains inserted in such vehicles, if the keyless go system fails for the above-mentioned reasons, the pushbutton can be immediately removed, and the driver can start the vehicle.

Integrating the mobile release device into the ignition key has the advantage that the driver does not need to carry the ignition key in addition to the mobile unit.

A further substantial cost saving is that no additional space needs to be provided for a starting button in the design of the cockpit.

The concentration on the system responsible for the driver authorization results in an optimization of installation space: Additional switches, cabling are avoided, and the space required for the driver authorization system in the passenger compartment is reduced.

The operator-friendly positioning of the pushbutton on the top of the gear selection lever or of the gearstick is no longer possible in "shift by wire" vehicles. Since the operating elements are positioned close to the steering wheel, the pushbutton is not positioned at the top in order to avoid operating errors by the driver. An operating-friendly pushbutton position is thus no longer available.

In one embodiment of the invention, the pushbutton can be mounted and actuated on and removed from the vehicle ignition lock and, when it is operated, the actuating element interacts with a release switch in the on-board ignition lock in order to activate ignition lock functions without rotating the rotary switch.

The pushbutton according to the invention has the advantage that it can be produced with little expenditure, and independently of the ignition lock unit.

The contactless power supply to the pushbutton via inductive voltage coupling is more maintenance-free than a direct mechanical coupling since the tractive forces are lower in the inductive coupling.

Other objects, advantages and novel features of the present invention will become apparent from the following detailed description of the invention when considered in conjunction with the accompanying drawings.

BRIEF DESCRIPTION OF THE DRAWINGS

In the drawing, an embodiment of the device according to the invention is shown diagrammatically, where in each case

DETAILED DESCRIPTION OF THE DRAWINGS

Figure 1:
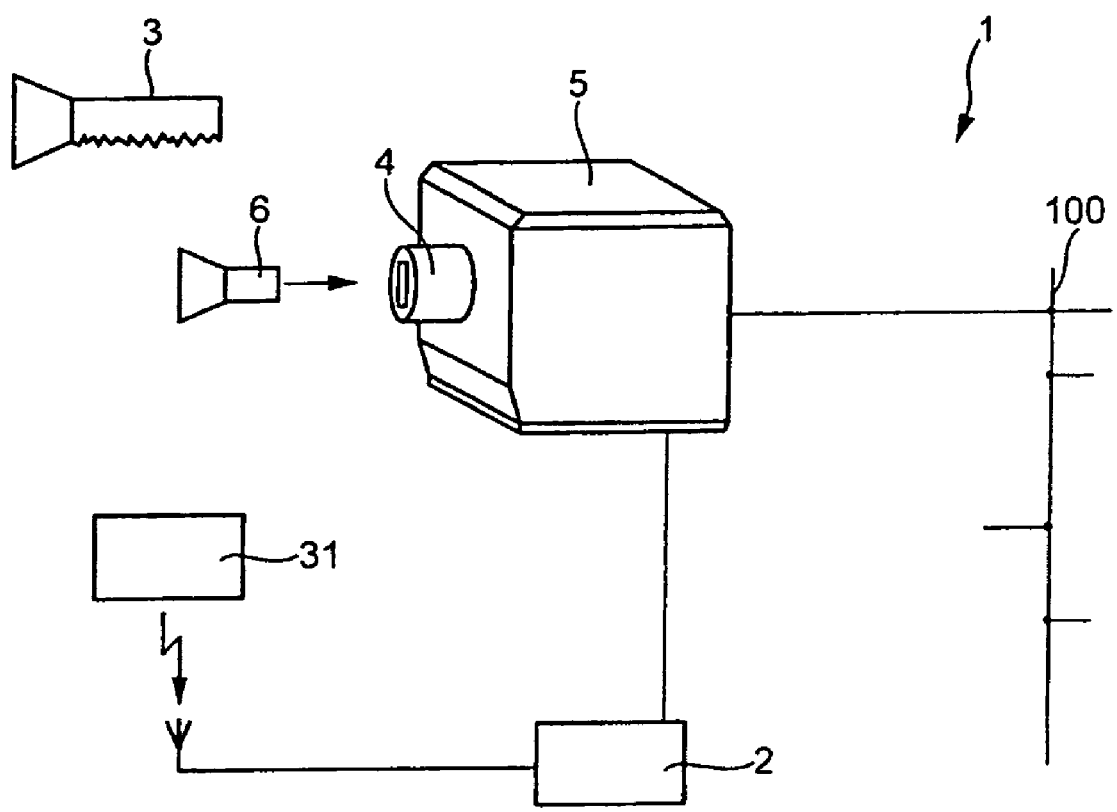
FIG. 1 shows a block diagram of the components according to a first embodiment of the invention.

The driver authorization system 1 for motor vehicles has an on-board identification device 2 for performing a dialog with a mobile release device 31 which verifies the usage authorization. The driver authorization system 1 has an electronic ignition lock (EIL) 4, into which an ignition key 3 can be inserted. The ignition lock functions (such as, for example, starting of the engine) can be activated by means of the control unit 5 of the EIL 4 via a pushbutton 6 which can be inserted into the ignition lock, actuated and removed. The control unit 5 of the EIL 4 can exchange data with other control units of the vehicle (particularly, it can implement the ignition lock functions) via a data bus 100.

Figure 2:
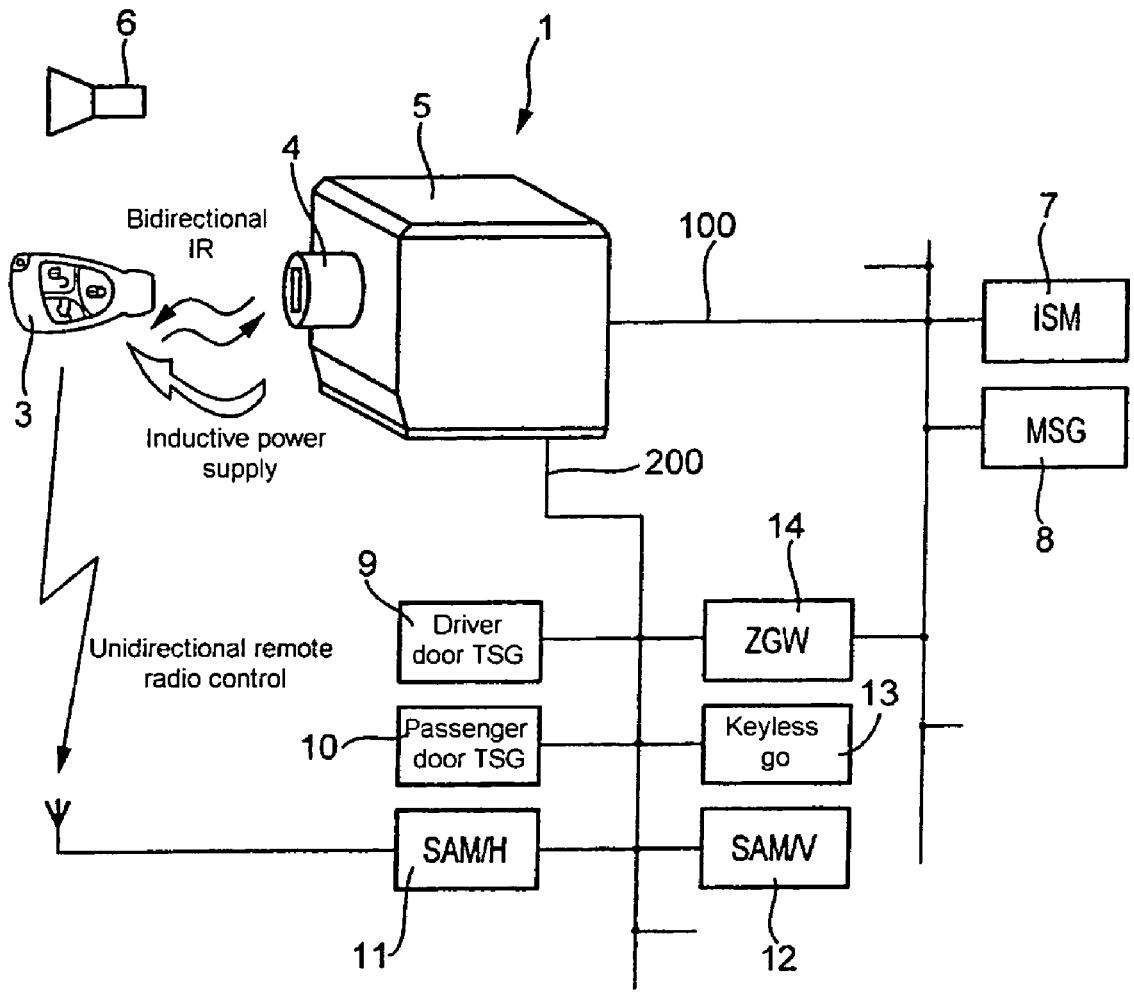
FIG. 2 shows a further embodiment of the invention.

As shown in FIG. 2, the driver authorization system 1 exhibits a keyless go authorization system with a standard system, in which the ignition lock functions (such as, for example, starting of the engine) can only be triggered by inserting and possibly rotating the mechanical ignition lock. The control units 5-14 shown in FIG. 2 enable the various ignition lock functions to be implemented.

The various control units 5-14 are connected to the control unit 5 of the EIL 4 via a data bus CAN-C 100 or a data bus CAN-B 200, respectively, and can also communicate directly via a central gateway (CGW) 14 connected between these databases 100, 200.

The network connecting the various control units 5-14 thus consists of the data bus CAN-C 100, CAN-B 200 and the CGW 14, the latter being used mainly as a router between the two databuses 100, 200.

In the embodiment of FIG. 2, a mobile release device 31 is integrated into the ignition key 3, and exchanges data with the identification device 2 by means of a transponder, an infrared (IR) and a radio-frequency (RF) transmitting/receiving unit.

In addition, the on-board identification device 2 is intergrated into the control unit 5, which is responsible for activating the various ignition lock functions such as, for example, "waking up the databus", "ignition on" and "starting the engine". The identification device 2 (integrated into the control unit 5) receives a release signal, generated with a successful usage authorization verification, via the data bus CAN-B 200. The control unit 5 of the EIL 4 is supplied with additional information from sensors about the position of the brake pedal, the clutch pedal and/or the door via the databuses CAN-C 100 and CAN-B 200.

The EIL 4 is constructed as rotary lock, which can be switched into a number of positions by means of the ignition key 3. In each position, different ignition lock functions are activated. The EIL 4 has two switches which are operated successively when the ignition key 3 is completely inserted, and generate an electrical signal. The control unit 5 of the EIL 4 recognizes from the order of the signals and on the basis of the switch from which the signal comes, whether the ignition key 3 is inserted half way or completely, or whether an ignition key 3 or a pushbutton 6 has been inserted. The pushbutton is identified by the fact that it triggers only one switch of the EIL 4, which has coils that provide for inductive voltage coupling to the pushbutton 6.

The pushbutton 6 can be inserted into the EIL 4, operated and removed. When it is operated, (by depressing it), an electrical signal is generated. Together with the signal from the identification device 2 and the information about the vehicle available in the control unit 5 of the EIL 4, the ignition lock functionalities of the rotary lock with ignition key 30 are replicated via the pushbutton 6.

In the EIL 4, the inserted pushbutton 6 is inductively supplied with voltage via the control unit 5, for illuminating the pushbutton 6 by means of light-emitting diodes.

An intelligent server module control unit (ISM) 7 is connected to the control unit 5 of the EIL 4 and the other control units 6-14 via the databus CAN-C 100. The ISM 7 monitors ignition lock functions which cannot be duplicated via an engine control unit (MSG) 8. For example, the ISM 7 locks the gearbox in the "P" position of the selection lever of an automatic gearbox or the ISM 7 cancels the immobilizer.

The MSG 8 is connected to the control unit 5 of the EIL 4 and the other control units 6-14 via the databus CAN-C 100, and converts the commands to the engine delivered by the control unit 5 of the EZS 4, such as "engine start" and "engine off".

The door control devices (TSG) of driver and passenger door 9, 10, which are connected to the network via the databus CAN-B 200, can be used to drive the locking motors of the doors. They also provide an infrared receiver, for the case where the key 3 is only used for access control (that is, opening the vehicle).

The signal detection and drive module for the rear (SAM/H) 11, which is also connected to the network via the databus CAN-B 200, has a transmitting/receiving device that is used for cableless (RF) data transmission to the mobile release device 31 integrated in the ignition key 3. The SAM/H 11 is thus used as a gateway between the mobile release device 31 in the ignition key 30 and the on-board network. The other control units 5-14 thus have access to the dialog data between mobile release device 31 and ignition key 3 and SAM/H 11 via the control unit SAM/H 11.

Similarly, the signal detection and drive module for the front (SAM/V) 12 is also connected to the network via the databus CAN B 200, and is used by the control unit 5 of the EIL 4 for switching terminals which is necessary in particular ignition lock functions. In particular, this relates to switching terminals "15" and "50".

A control unit 13 for converting the keyless go functions, (also is connected to the network via the databus CAN-B 200) has a source of inductance for waking up the transponder in the mobile release device 31 in the ignition key 30. The keyless go system control unit thus determines the location of the mobile release device 31 or of the ignition key 3, respectively, and initiates the release dialog. The control unit 13 is preferably active only when the pushbutton 6 is inserted into the EIL and the driver authorization system 1 is operated in keyless go mode.

In the standard system without keyless go functions, (that is, without the pushbutton 6 inserted in the EIL 4), the driver authorization system 1 first verifies the access authorization by means of the TSG 9, 10. As soon as the user is in the vehicle and inserts the ignition key 3 into the EIL 4, the driver authorization is verified by means of JR communication via EIL 4. Access authorization and the opening of the doors are implemented by sending a coded signal by means of the IR transmitter of the mobile release device 31 in the ignition key 3 to the TSG 9. When the user has been successfully identified from the transmitted signal by the identification device 2, the doors are opened by means of the TSG 9, 10 via the control unit 5. The user enters the vehicle.

Driver authorization is verified via the possession of the ignition key belonging to the vehicle. For this purpose, the ignition key identity is checked in the first position, position "0" of the EIL 4, which corresponds to the position "key inserted". In this position, the signal "key inserted" is generated if the ignition key 3 is completely inserted. A release dialog is conducted between the release device 31 and the identification device 2 via IR communication. When authorization is given, the on-board system is awakened, and the immobilizer and other theft protection systems are cancelled.

The other positions of the EIL 4 activate further ignition lock functions:

Position "1" corresponds to the radio setting. In this position, the convenience electronics such as radio, window opener, seat adjustment etc. are taken into operation.

Position "2" corresponds to the position "ignition on". In this position, voltage is applied to an appropriate terminal. The drive train electronics such as engine control unit, chassis control unit etc. are taken into operation.

Position "3" corresponds to engine start. In this position, voltage is applied to an appropriate terminal. The engine is started.

With keyless go functions (that is, with pushbutton 6 inserted into EIL 4), the driver authorization system 1 operates as follows: first, it verifies the access authorization and the driver authorization via the keyless go control unit 13, the identification device 2 and the pushbutton 6. No ignition key 3 is inserted into the EIL 4 in order to start the engine.

Establishing contact with the mobile release device 31 integrated into the ignition key 3 by the control unit 13 is initiated by an action of the user at the vehicle, for example touching the driver's door, pressing the pushbutton etc. During this process, the keyless go control unit 13 produces an inductive field which is sufficient for waking up the transponder. The mobile release device 31 then switches to RF transmission for the actual release dialog. During this process, a coded identification signal is forwarded via the SAM/H 11 to the CAN-B 200, where it can then be picked up and verified by the identification device 2 and a release signal can be forwarded.

By means of the inserted pushbutton 6 and the additional information of the control unit 5 about brake pedal position, door position etc., the ignition lock functions defined by means of the positions "0, 1, 2, 3" of the EIL 4 can now also be activated.

Inserting the pushbutton 6 into the EIL 4 does not trigger any response. When the pushbutton 6 is pressed, however, a pair of plungers (FIG. 3) extends, which generates only the signal "key inserted" in the EIL 4, without actuating any other switch in the EIL 4. The control unit 5 of the EIL 4 thus recognizes that it is not an ignition key 3, but the pushbutton 6 which has been inserted in the EIL 4. The release dialog is correspondingly started via the keyless go control unit 13. As mentioned above, the control unit 13 then searches for the mobile release device 31. When the authorization has been successfully verified by the identification device 2, a release signal is produced which is then checked by the control unit 5 of the EIL 4 for activating the ignition lock functions.

The ignition lock function of position "3" of the EIL 4 (engine start) is activated by pressing the pushbutton 6 and simultaneously operating the brake.

The ignition lock function of position "1" of the EIL 4 (radio position) is activated by pressing the pushbutton 6 a first time and simultaneously not operating the brake.

The ignition lock function of position "2" of the EIL 4, ("ignition on") is activated by pressing the pushbutton 6 a second time and simultaneously not operating the brake.

The ignition lock function of position "0" of the EIL 4, ("key inserted") is activated by pressing the pushbutton 6 a third time, simultaneously not operating the brake and all doors being closed at the same time.

Figure 3:
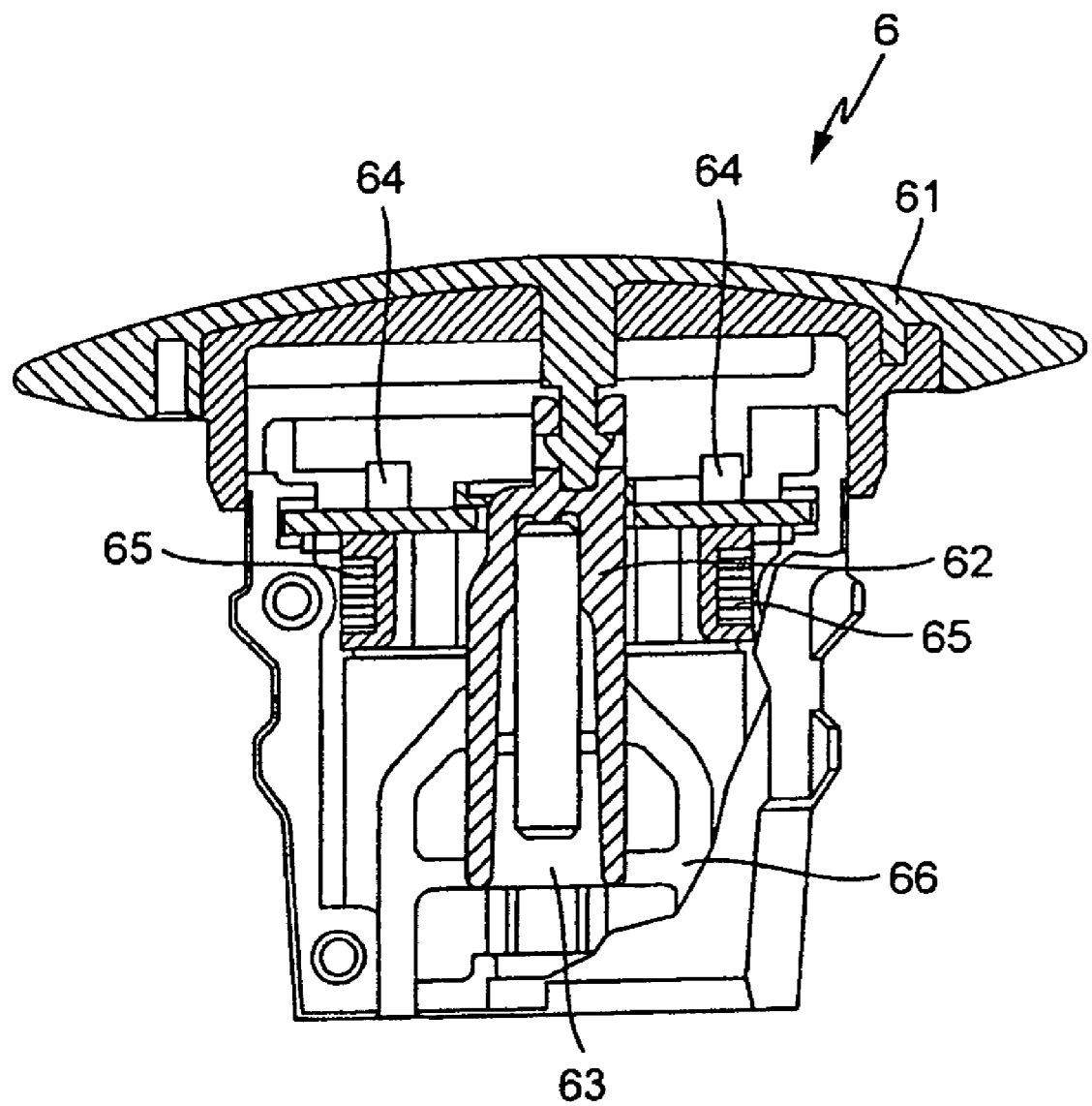
FIG. 3 shows a longitudinal section through the pushbutton according to the invention.

FIG. 3 shows that the pushbutton 6 has a cap 61 via which an actuator 62 is pressed. The actuator 62 is elastically supported via a restoring spring (compression spring) 63 so that it returns to its initial position after having been operated. When the actuator is pressed, it is moved to a position which is predetermined by a locking slide. The actuator 62 is mechanically connected to a pair of plungers 66 (release plungers) which can be released in parallel with an axis of symmetry of the pushbutton when operated. Pressing the actuator 62 thus also moves the pair of plungers which triggers the signal "key inserted" by operating the switch in the EIL 4. The structure of the pushbutton 6 (the cap 61, the actuator 62, plunger, and the compression spring) is enclosed in a left- and right-hand sleeve.

The pushbutton 6 also has two light-emitting diodes (LED) 64 on a circuit board that is attached to the top of the actuator. Underneath the circuit board, a coil 65 for inductive voltage coupling to the EIL 4 is in each case attached. The inductive voltage coupling supplies voltage to the LEDs, which illuminate the cap 61 of the pushbutton 6.

The EIL 4 also has two coil units 65 which are arranged in such a manner that the coils of the inserted pushbutton 6 largely overlap the coils of the EIL 4. This ensures optimum energy transmission between EIL 4 and pushbutton 6. The coils in the EIL 4 are supplied with alternating frequency via the control unit 5 only when a signal for the finding or search illumination of the displays and knobs in the vehicle is present from a brightness sensor on the CAN-B 200.

The pushbutton 6 can also be constructed as electronic unit. In this arrangement, touching the pushbutton triggers an electronic signal via a sensor, which signal is forwarded to the control unit 5 via the ignition lock 4.

The pushbutton 6 is constructed so that it can be inserted into the ignition lock 4, actuated and removed. It can also be mounted, for example, on a holder attached to the ignition lock 4. For this purpose, the holder could accommodate a bayonet or turn-lock fastener.

The pushbutton 6 can also be equipped with a wireless communication unit which, when the pushbutton is operated, communicates with the release device and/or control unit as a result of which the ignition lock functions described above are activated.

The databus used are CAN databuses. However, it could also be another databus system such as, for example, MOST, Flex-Ray. It could also be a so-called wireless network. The important factor is only that the control unit 5 of the EIL, the mobile release device 31 and the EIL 4 can exchange data with one another and with the corresponding control units of the vehicle for implementing the ignition lock functions.

The mobile release device 31 can be constructed as a credit card, key or similar mobile unit. The embodiment in the ignition key 3 is obvious since the driver then always has both opportunities for operation. The type of data transmission for the mobile release device 31 is not restricted to IR, RF, transponder. Instead, wireless data transmission is the main type considered.

It is also not necessary to distribute the various functions to the control units 5-14. For example, the identification device 2 can also be implemented in a separate control unit. The control unit 13 could be integrated in the control unit 5 of the EIL 4, etc.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A driver authorization system for a vehicle, comprising:
an on-board identification device for communicating with a mobile release device to verify a usage authorization;
a rotary ignition lock for an ignition key; and
a control unit for activating ignition lock functions when the ignition key is brought into a corresponding position in the rotary ignition lock; wherein,
the ignition lock functions are activatable by the control unit in response to a signal from a pushbutton unit;
the pushbutton unit is mountable in, actuated while mounted, and removed from, the rotary ignition lock as an alternative to the ignition key; and
means are provided which allow the ignition lock functions to be activated without rotating the rotary ignition lock.

2. The driver authorization system as claimed in claim 1, wherein the rotary ignition lock comprises a rotary switch.

3. The driver authorization system as claimed in claim 1, wherein the pushbutton unit, when operated, generates a signal which starts a communication authorizing usage.

4. The driver authorization system as claimed in claim 1, wherein:
when the pushbutton unit is operated, the ignition lock functions are activated by the control unit on the basis of additional vehicle information; and
the additional vehicle information comprises position of at least one of a brake pedal, a clutch pedal and a vehicle door.

5. A pushbutton with an actuating element for activating ignition lock functions of a vehicle, including starting and switching off the vehicle engine, wherein:
the pushbutton is adapted to be mounted in, actuated while mounted, and removed from, a rotary ignition lock of a vehicle;
the pushbutton is adapted to be supplied with power via an inductive voltage coupling to the rotary ignition lock;
when the pushbutton is operated, the actuating element interacts with a release switch in the rotary ignition lock, to activate ignition lock functions without rotating the rotary ignition lock; and
the actuating element includes a release plunger which, when operated, is releasable in parallel with an axis of symmetry of the pushbutton in order to operate the release switch in the rotary ignition lock.

6. A pushbutton with an actuating element for activating ignition lock functions of a vehicle, including starting and switching off the vehicle engine, wherein:
the pushbutton is adapted to be mounted in, actuated while mounted, and removed from, a rotary ignition lock of a vehicle;
when the pushbutton is operated, the actuating element interacts with a release switch in the rotary ignition lock, to activate ignition lock functions without rotating the rotary ignition lock;
the actuating element includes a release plunger which, when operated, is releasable in parallel with an axis of symmetry of the pushbutton in order to operate the release switch in the rotary ignition lock; and
an end position of the release plunger is limited by locking sliders arranged laterally to the axis of the release plunger.

7. The pushbutton as claimed in claim 1, further comprising a locating illumination unit which is contactlessly supplied with power.

8. The pushbutton as claimed in claim 7, wherein the pushbutton is supplied with power via an inductive voltage coupling to the rotary ignition lock.

* * * * *

UNITED STATES PATENT AND TRADEMARK OFFICE
CERTIFICATE OF CORRECTION

PATENT NO. : 7,576,636 B2  Page 1 of 1
APPLICATION NO. : 10/528148
DATED : August 18, 2009
INVENTOR(S) : Dornbach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 642 days.

Signed and Sealed this

Seventh Day of September, 2010

David J. Kappos
*Director of the United States Patent and Trademark Office*